United States Patent

[11] 3,573,601

[72] Inventor Albert H. Esser
Clifton, N.J.
[21] Appl. No. 805,308
[22] Filed Mar. 7, 1969
[45] Patented Apr. 6, 1971
[73] Assignee The Bendix Corporation

[54] TRANSFORMERLESS PULSE WIDTH MODULATED INVERTER FOR PROVIDING THREE PHASE VOLTAGE FOR A THREE WIRE LOAD
8 Claims, 4 Drawing Figs.

[52] U.S. Cl. .......... 321/9, 321/5
[51] Int. Cl. .......... H02m 1/12, H02m 7/52
[50] Field of Search .......... 321/5, 9, 9 (R), (SW)

[56] References Cited
UNITED STATES PATENTS

| | | | |
|---|---|---|---|
| 3,324,376 | 6/1967 | Hunt .......... | 321/9AUX |
| 3,436,643 | 4/1969 | Castiglione .......... | 321/9 |
| 3,461,373 | 8/1969 | Mokrytzki .......... | 321/9 |
| 3,487,288 | 12/1969 | Reid, Jr. et al. .......... | 321/9 |

FOREIGN PATENTS

| | | | |
|---|---|---|---|
| 1,036,464 | 7/1966 | Great Britain .......... | 321/9AUX |

*Primary Examiner*—William H. Beha, Jr.
*Attorneys*—Ronald G. Gillespie and Plante, Hartz, Smith & Thompson

ABSTRACT: A direct current to three phase inverter in which each 90° segment of a sinusoidal voltage is divided into three 30° sections and only two pulse widths are required to approximate the area of the sinusoidal voltage. One pulse width is used during one 30° section, the second pulse width is used during another 30° section and the difference between the two pulse widths is used during a third 30° section. The two pulse widths are chosen so that the area under the pulses approximates the area under each 30° section of the sinusoidal voltage.

INVENTOR.
ALBERT H. ESSER
BY Ronald G. Gillespie
ATTORNEY

INVENTOR.
ALBERT H. ESSER
BY Ronald G. Gillespie
ATTORNEY

INVENTOR.
ALBERT H. ESSER
BY Ronald G. Gillespie
ATTORNEY

TRANSFORMERLESS PULSE WIDTH MODULATED INVERTER FOR PROVIDING THREE PHASE VOLTAGE FOR A THREE WIRE LOAD

BACKGROUND OF THE INVENTION

1. Field of the Invention

This invention relates to electric conversion systems and, more particularly, to an electric conversion system with means to eliminate frequency components.

2. Description of the Prior Art

Heretofore, inverters such as disclosed in U.S. Pat. No. 3,324,374, issued to P. D. Corey, attenuate high frequency harmonic components by building up stepped wave voltages prior to filtering the voltages to provide sinusoidal voltages. The inverter shown in the Corey patent used extensive circuitry including transformers to provide the built up stepped wave voltages.

The present invention utilizes an entirely different concept to attenuate the high frequency harmonic components by providing modulated voltages with each modulated voltage having pulses whose areas approximate the area of a sinusoidal voltage. Only two pulse widths *M* and *N* are used and they have a fixed ratio to each other thus reducing the number of pulse generation and control circuits needed.

The present invention further distinguishes over the Corey patent by using electronic switches for modulating a direct current voltage to avoid the use of transformers thereby reducing the size and weight of the inverter.

SUMMARY OF THE INVENTION

An inverter for converting a direct current voltage to polyphase sinusoidal voltages comprising means for providing a modulated voltage, each phase of the polyphase voltage and each phase of the modulated voltages including a pulse of width *M* during the first 30° of a quarter cycle of one phase of the polyphase voltage, a pulse of width *N* minus *M* during the second 30° and a pulse of width *N* during the third 30°. The pulse of width *M* approximating the area in the first 30° of one phase of the polyphase voltage and the pulse of width *N* approximating the area of the third 30°. The pulses in the following quarter cycle occur in a reverse sequence to pulses in the preceding quarter cycle and the pulses at the following half cycle occurring in the same sequence as in the preceding half cycle but being of opposite polarity. Means connected to the modulated voltage means for converting the modulated voltages to sinusoidal voltages.

The modulated voltage means includes a pulse generator providing two trains of pulses of widths *M* and *N*, a source of timing pulses connected to the pulse generator, a logic circuit connected to the source of timing pulses and to the pulse generator for providing a pulse signal train for each phase of the polyphase sinusoidal voltages for modulating a direct current voltage. Control means for maintaining the sinusoidal voltages at a constant amplitude compares the sinusoidal voltages to a reference voltage and provides a control voltage, to the pulse generator corresponding to the comparison, for changing the width of pulses of widths *M* and *N*.

One object of the present invention is to provide a direct current-to-alternating current inverter of less size and weight and having fewer parts than inverters used heretofore.

Another object of the invention is to use pulses having areas which approximate areas of corresponding segments of a sinusoidal voltage.

Another object of the invention is to provide an inverter in which only two pulse widths need be regulated to generate sinusoidal voltages equivalent areas.

Another object of the invention is to provide a direct current-to-alternating current inverter for generating polyphase sinusoidal voltages.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
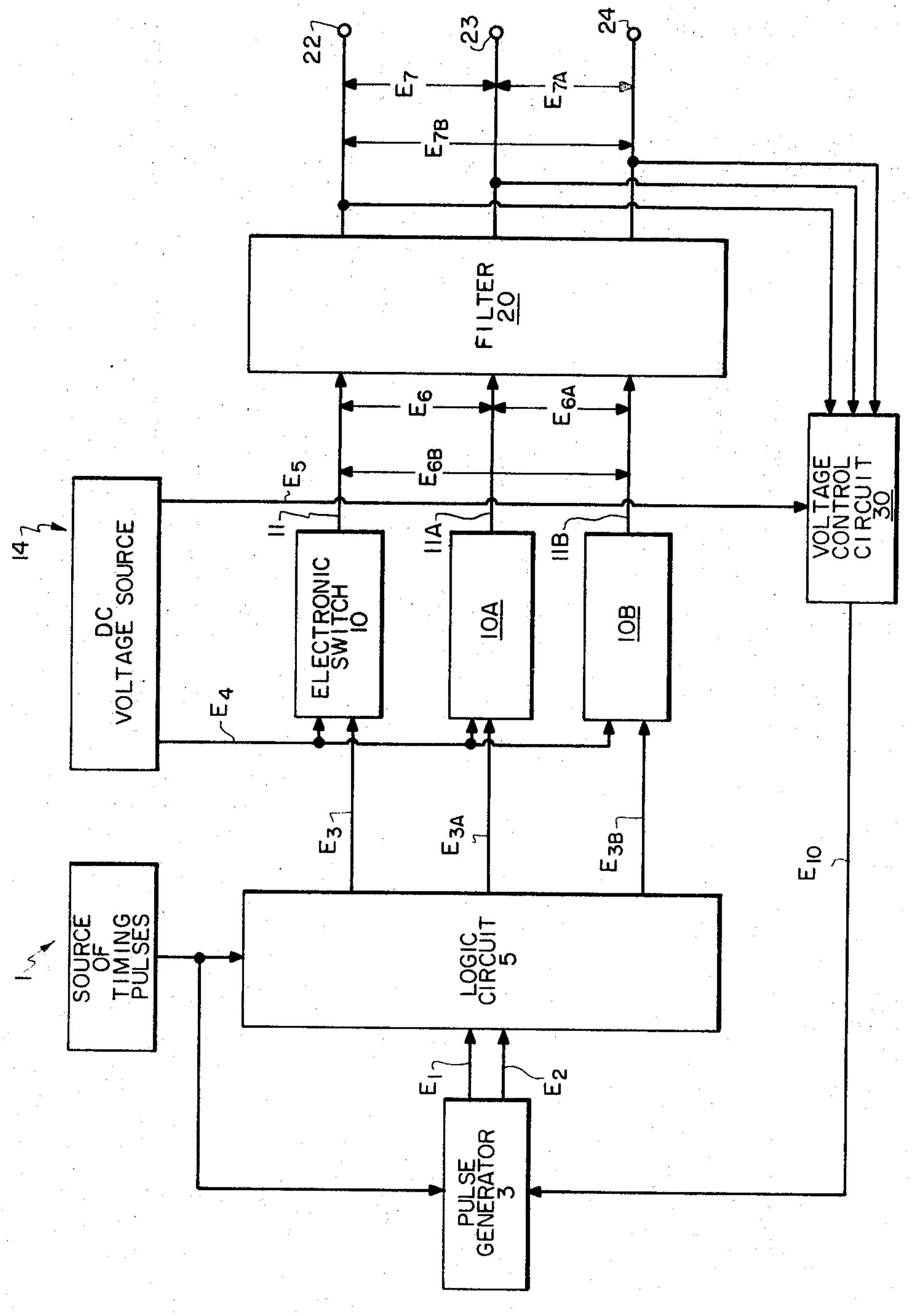
FIG. 1 is a block diagram showing one embodiment of a novel direct current-to-alternating current inverter constructed in accordance with the present invention.

Referring to FIG. 1, there is shown a novel inverter for converting a direct current voltage to a three-phase alternating current voltage which may be used for operating a three terminal alternating current motor. A source 1 provides timing pulses to a pulse generator 3 and a logic circuit 5. Pulse generator 3 is connected to logic circuit 5 and provides trains of pulses $E_1$ and $E_2$, having pulse widths *M* and *N*, respectively, at a repetition rate controlled by the timing pulses. Pulse widths *M* and *N* have a fixed ratio so that changing pulse width *M* causes pulse width *N* to change accordingly for the reasons described hereinafter.

Figure 2:
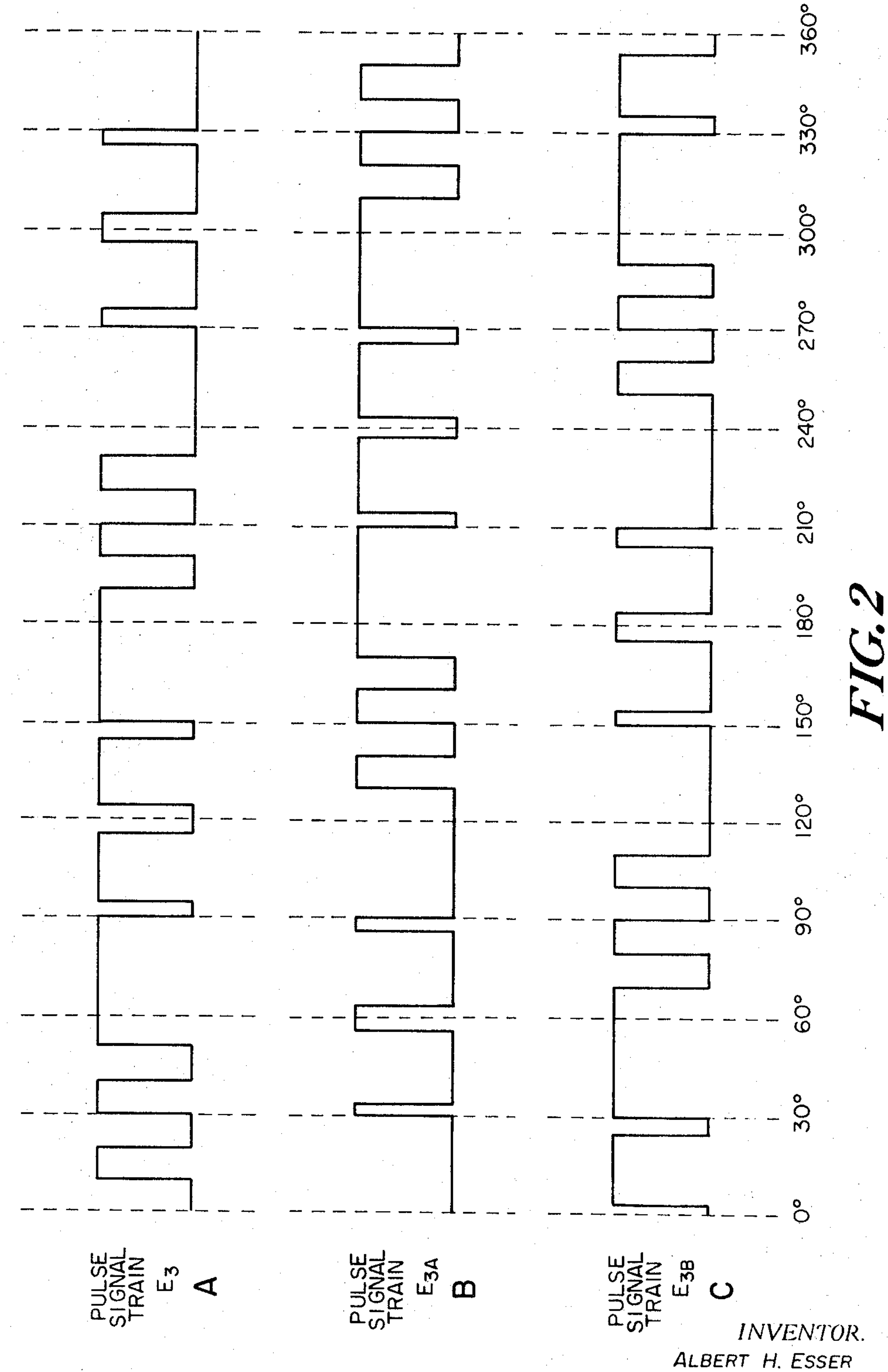
FIG. 2 shows pulse signals from the logic circuit block shown in FIG. 1 during one cycle of operation for a three-phase alternating current output applied to a three wire load.

Logic circuit 5 provides three identical pulse signal trains $E_3$, $E_{3A}$ and $E_{3B}$ having a phase difference of 120° as shown in FIGS. 2A, 2B and 2C, respectively, in response to the timing pulses and pulses $E_1$ and $E_2$.

Electronic switches 10, 10A and 10B receive pulse signal trains $E_3$, $E_{3A}$ and $E_{3B}$, respectively, from logic circuit 5 along with a direct current voltage $E_4$ from a source 14 of direct current voltage which also provides a reference direct current voltage $E_5$ for the purpose described hereinafter.

Figures 3A, 3B:
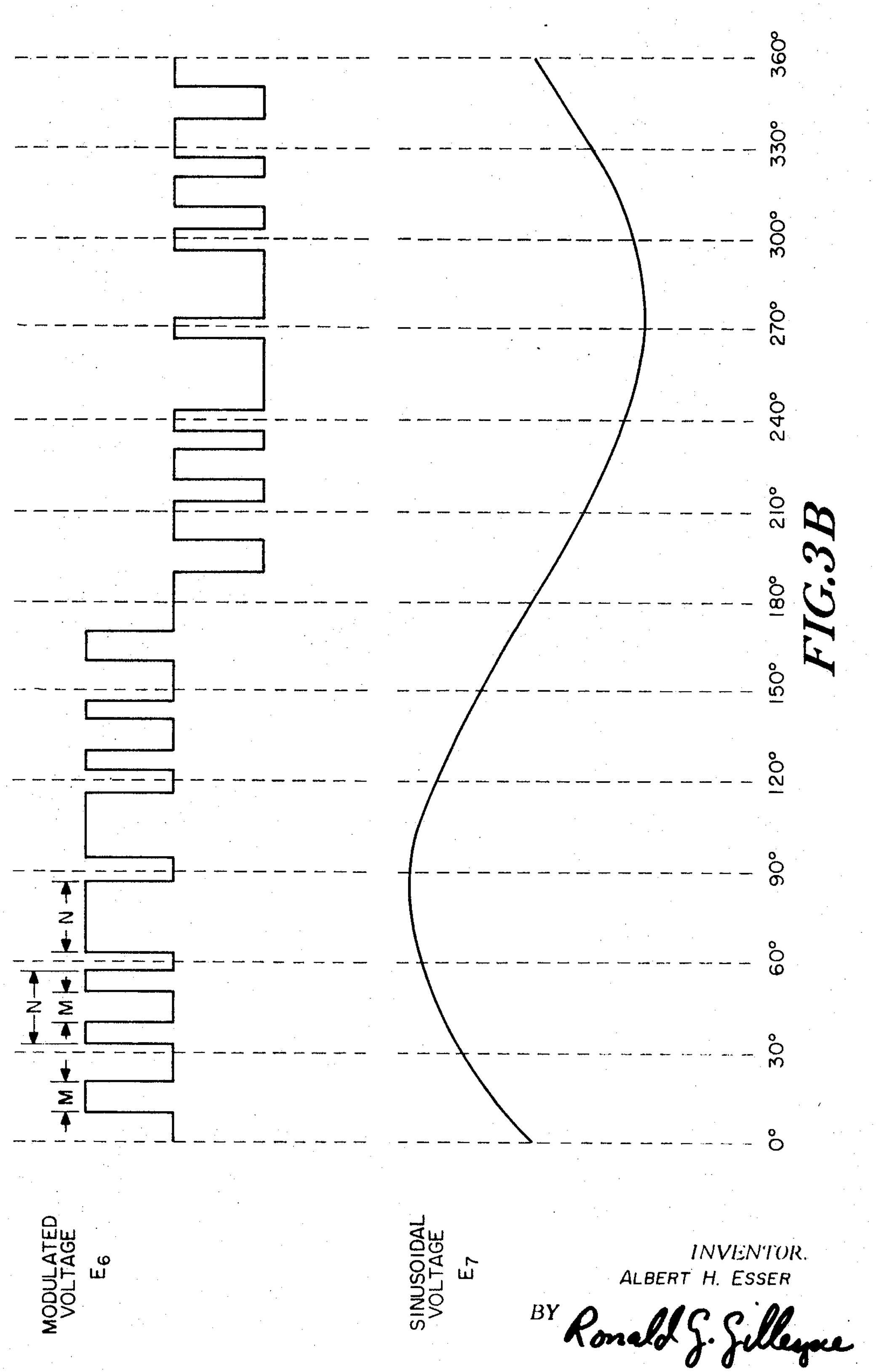
FIG. 3A shows a voltage modulated by two electronic switches shown in FIG. 1 controlled by pulse signals shown in FIGS. 2A and 2B during one cycle of operation.
FIG. 3B shows a sinusoidal voltage obtained by filtering the modulated voltage shown in FIG. 3A.

Switches 10 and 10A and 10B modulate direct current voltage $E_4$ in response to pulse signal trains $E_3$, $E_{3A}$ and $E_{3B}$ and provide modulated voltages corresponding in amplitude to direct current voltage $E_4$ and similar to pulse signal trains $E_3$, $E_{3A}$ and $E_{3B}$ on lines 11, 11A and 11B, respectively. Modulated voltage $E_6$ shown in FIG. 3A is a voltage difference taken across lines 11 and 11A. When a pulse occurs in only one pulse signal train, $E_3$ or $E_{3A}$ for example, a voltage difference developes across lines 11 and 11A because only one switch 10 or 10A passes direct current voltage $E_4$ having a polarity depending on which electronic switch, 10 or 10A, passes the direct current voltage $E_4$. When pulses occur simultaneously or when there is a simultaneous absence of pulses in pulse signal trains $E_3$ and $E_{3A}$, the voltage difference across lines 11 and 11A is zero because the outputs from switches 10 and 10A have the same amplitudes. Similarly, switches 10A and 10B, and 10 and 10B provide modulated voltages $E_{6A}$ and $E_{6B}$, across lines 11A and 11B and lines 11 and 11B, respectively, in response to pulse signals $E_3$, $E_{3A}$ and $E_{3B}$. Modulated voltages $E_6$, $E_{6A}$ and $E_{6B}$ are identical and have a phase difference of 120°.

Referring to FIG. 3A, the first quarter-cycle of each cycle of modulated voltage $E_6$ has a first positive pulse having pulse width *M* and occurring during a first 30° segment of the first quarter-cycle second and third positive pulses, each having a pulse width equal to one-half of the difference between pulse widths *M* and *N*, separated by width *M* and occurring during a second 30° segment; and a fourth positive pulse having pulse width *N* and occurring during a third 30° segment. The second quarter-cycle has the same pulses as the first quarter-cycle but the pulses are in reverse sequence. The third and foruth quarter-cycle have negative pulses identical to and in the same sequence as the positive pulses in the first and second quarter-cycle respectively.

The relationship between the pulses of a modulated voltage and a corresponding sinusoidal voltage is shown in the following equations. Referring to FIG. 3B, the area for the 0° to 30° segment of a sinusoidal voltage $E_7$ is:

$$A_{0°-30°}=\int_{0°}^{30°} \sin \theta d\theta \quad (1)$$

or $$A_{0°-30°}=-\cos \theta \Big|_{0°}^{30°} \quad (2)$$

or $$A_{0°-30°}=(1-.86603)=.13397 \quad (3)$$

Similarly, the areas for the 30° to 60° and the 60° to 90° segments of sinusoidal voltage $E_7$ are $$A_{30°-60°}=.36603 \quad (4)$$

and $$A_{60°-90°}=.5 \quad (5)$$

Due to the symmetry of sinusoidal voltage $E_7$ $$A_{0°-30°}=A_{150°-180°}=A_{180°-210°}=A_{330°-360°} \quad (6)$$

and $$A_{30°-60°}=A_{120°-150°}=A_{210°-240°}=A_{300°-330°} \quad (7)$$

and $$A_{60°-90°}=A_{90°-120°}=A_{240°-270°}=A_{270°-300°} \quad (8)$$

Since $$.13397+.36603=.5 \quad (9)$$

it follows from substitution that $$A_{0°-30°}+A_{30°-60°}=A_{60°-90°} \quad (10)$$

or $$A_{60°-90°}-A_{0°-30°}=A_{30°-60°} \quad (11)$$

From the above it is seen that the area of the 30° to 60° segment of a sinusoidal wave is equal to the difference in the area of the 60° to 90° segment less the area of the 0° to 30° segment.

The area of the first pulse having width $M$, shown in the 0° to 30° segment of modulated voltage $E_6$ in FIG. 3A, is approximately equal to the area of the same segment of a sinusoidal voltage $E_7$, shown in FIG. 3B. The area of the second and third pulses is equal to the difference in area of the pulses $N-M$ and approximates the area of the 30° to 60° segment of sinusoidal voltage $E_7$. The area of the fourth pulse having width $N$ approximates the area of the 60° to 90° segment of sinusoidal voltage $E_7$.

Since all the pulses shown in FIG. 3A have the same amplitude, the areas of the pulses differ as a function of their widths. From equation (11) it follows that:

$N-M$ the pulse width for pulses occurring in the 30°—60°, 120°—150°, 210°—240°, and 300°—330° segments (12)

Also the $$\text{amplitude}=\frac{A_{0°-30°}}{.13397}=\frac{A_{60°-90°}}{.5} \quad (13)$$

Therefore, $$A_{0°-30°}=\frac{.13397}{.5}A_{60°-90°} \quad (14)$$

or $$(\text{amplitude})\times M=\frac{.13397}{.5}\times(\text{amplitude})\times N \quad (15)$$

or $$M=.26798N \quad (16)$$

As seen in equation (16), the changing of one pulse width causes a corresponding change in the other pulse width so that only one pulse width control circuit is required.

Modulated voltages $E_6$, $E_{6A}$ and $E_{6B}$ are applied to a filter 20 by lines 11, 11A and 11B. Filter 20 filters out harmonic frequency components contained in modulated voltage $E_6$ and provides fundamental frequency sinusoidal voltage $E_7$ as shown in FIG. 3B. Similarly, filter 20 filters modulated voltages $E_{6A}$ and $E_{6B}$ and provides sinusoidal voltages $E_{7A}$ and $E_{7B}$, respectively. Sinusoidal voltages $E_7$, $E_{7A}$ and $E_{7B}$, which are 120° out of phase with each other, are applied to output terminals 22, 23 and 24 and to a voltage control circuit 30.

Control circuit 30, which is also connected to direct current voltage source 14, compares an average of voltages $E_7$, $E_{7A}$ and $E_{7B}$ from filter 20 to reference voltage $E_5$ from direct current voltage source 14 and provides a control voltage $E_{10}$ to pulse generator 3 corresponding to the comparison. Pulse generator 3 varies the widths $M$ and $N$ of pulses $E_1$ and $E_2$, respectively, in accordance with control voltage $E_{10}$. The change in pulse widths $M$ and $N$ causes a corresponding change in the amplitudes of sinusoidal voltages $E_7$, $E_{7A}$ and $E_{7B}$ so as to regulate voltages $E_7$, $E_{7A}$ and $E_{7B}$.

The amplitude of sinusoidal voltages $E_7$, $E_{7A}$ and $E_{7B}$ may be varied by changing the amplitude of direct current voltage $E_4$ from direct current voltage source 14. The frequency of the sinusoidal voltage may be varied by changing the repetition rate of the timing pulses from source 1.

Although a three-phase inverter has been shown, the number of phases may be changed by changing the internal construction of logic circuit 5 and the number of electronic switches to provide a number of modulated voltages having the desired phase difference.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. An inverter for converting a direct current voltage to three-phase sinusoidal voltages comprising means for providing two pulse trains, one pulse train having pulses of width $M$ and the other pulse train having pulses of width $N$, means receiving a direct current voltage and responsive to the pulse trains for modulating the direct current voltage to provide three modulated voltages having 120° phase difference with each other, converting means connected to the modulating means for converting the voltage differences between the three modulated voltages to provide the three-phase sinusoidal voltages, and in which the voltage difference between two modulated voltages includes a pulse of width $M$ during the first 30° of a quarter cycle of one phase of the polyphase voltage, a pulse of width $N$ minus $M$ during the second 30°, and a pulse of width $N$ during the third 30°, the pulse of width $M$ approximating the area in the first 30° of one phase of the polyphase voltage and the pulse of width $N$ approximating the area in the third 30°, the pulses in the following quarter cycle occurring in a reverse sequence to the pulses in the preceeding quarter cycle and the pulses in the following half cycle occurring in the same sequence as the preceeding half cycle but being of opposite polarity.

2. An inverter of the kind described in claim 1 in which the pulse in the second 30° of each quarter cycle is replaced by two pulses of widths one-half of the difference of $N-M$ spaced a distance $M$ during the second 30° of each quarter cycle, and the converting means includes means for providing three-phase sinusoidal voltages for use with a three-wire load.

3. An inverter for converting a direct current voltage to three-phase sinusoidal voltages comprising means for providing two pulse trains, one pulse train having pulses of width $M$ and the other pulse train having pulses of width $N$, means receiving a direct current voltage and responsive to the pulse trains for modulating the direct current voltage to provide three modulated voltages having 120° phase difference with each other, converting means connected to the modulating means for converting the voltage differences between the three modulated voltages to provide the three-phase sinusoidal voltages, and in which the converting means is a filter which filters out harmonic frequency components in the modulated voltages to provide the sinusoidal voltages.

4. An inverter for converting a direct current voltage to three-phase sinusoidal voltages comprising means for providing two pulse trains, one pulse train having pulses of width $M$ and the other pulse train having pulses of width $N$, means receiving a direct current voltage and responsive to the pulse trains for modulating the direct current voltage to provide three modulated voltages having 120° phase difference with each other, converting means connected to the modulating means for converting the voltage differences between the three modulated voltages to provide the three-phase sinusoidal voltages, and means to vary the direct current voltage to change the amplitude of the sinusoidal voltages.

5. An inverter for converting a direct current voltage to three-phase sinusoidal voltages comprising means for providing two pulse trains, one pulse train having pulses of width $M$ and the other pulse train having pulses of width $N$, means receiving a direct current voltage and responsive to the pulse trains for modulating the direct current voltage to provide three modulated voltages having 120° phase difference with each other, converting means connected to the modulating means for converting the voltage differences between the three modulated voltages to provide the three-phase sinusoidal voltages, and control means for maintaining the sinusoidal voltages at a constant amplitude connected to the pulse train means and to the converting means, the control means having means for comparing the sinusoidal voltages to a reference voltage and means for controlling the width of pulses of width $M$ and $N$.

6. An inverter for converting a direct current voltage to three-phase sinusoidal voltages comprising means for providing two pulse trains, one pulse train having pulses of width $M$ and the other pulse train having pulses of width $N$, means receiving a direct current voltage and responsive to the pulse trains for modulating the direct current voltage to provide three modulated voltages having 120° phase difference with each other, converting means connected to the modulating means for converting the voltage differences between the three modulated voltages to provide the three-phase sinusoidal voltages, and in which the pulse train means includes a source of timing pulses, and a pulse generator connected to the timing pulse source and providing the pulse trains in response to the timing pulses; and the modulating means includes a logic circuit connected to the timing pulse source and to the pulse generator and providing a pulse control signal, in response to the pulse trains and to the timing pulses, for each phase of the three-phase sinusoidal voltages for modulating a direct current voltage, and in which the modulating means includes a plurality of switching means connected to the logic circuit and receiving the direct current voltage and controlled by the pulse control signal for modulating the direct current voltage for providing the modulated voltages.

7. An inverter for converting a direct current voltage to three-phase sinusoidal voltages comprising means for providing two pulse trains, one pulse train having pulses of width $M$ and the other pulse train having pulses of width $N$, means receiving a direct current voltage and responsive to the pulse trains for modulating the direct current voltage to provide three modulated voltages having 120° phase difference with each other, converting means connected to the modulating means for converting the voltage differences between the three modulated voltages to provide the three-phase sinusoidal voltages, and in which the pulse train means includes a source of timing pulses, and a pulse generator connected to the timing pulse source and providing the pulse trains in response to the timing pulses; and the modulating means includes a logic circuit connected to the timing pulse source and to the pulse generator and providing a pulse control signal, in response to the pulse trains and to the timing pulses, for each phase of the three-phase sinusoidal voltages for modulating a direct current voltage, and in which the source of timing pulses has means for changing the repetition rate of the timing pulses to change the frequency of the sinusoidal voltages.

8. An inverter for converting a direct current voltage to three-phase sinusoidal voltages comprising means for providing two pulse trains, one pulse train having pulses of width $M$ and the other pulse train having pulses of width $N$, means receiving a direct current voltage and responsive to the pulse trains for modulating the direct current voltage to provide three modulated voltages having 120° phase difference with each other, converting means connected to the modulating means for converting the voltage differences between the three modulated voltages to provide the three-phase sinusoidal voltages, and in which the pulse train means includes a source of timing pulses, and a pulse generator connected to the timing pulse source and providing the pulse trains in response to the timing pulses; and the modulating means includes a logic circuit connected to the timing pulse source and to the pulse generator and providing a pulse control signal, in response to the pulse trains and to the timing pulses, for each phase of the three-phase sinusoidal voltages for modulating a direct current voltage, and means to vary the direct current voltage to change the amplitude of the sinusoidal voltages, and in which the source of timing pulses is connected to the pulse generator and has means for changing the repetition rate of the timing pulses to change the frequency of the sinusoidal voltages.